UNITED STATES PATENT OFFICE.

GEORGE M. RICE, 2D, AND ALFRED L. RICE, OF WORCESTER, MASS.; SAID ALFRED L. RICE ASSIGNOR TO SAID GEO. M. RICE, 2D.

ART OF SEPARATING VEGETABLE FIBERS FROM ANIMAL FIBERS.

SPECIFICATION forming part of Letters Patent No. 235,170, dated December 7, 1880.

Application filed April 17, 1880. (No specimens.)

*To all whom it may concern:*

Be it known that we, GEORGE M. RICE, 2d, and ALFRED L. RICE, both of Worcester, in the county of Worcester and State of Massachusetts, have invented certain new and useful Improvements in the Art of Separating Animal Fibers from Vegetable Fibers; and we declare the following to be a description of our said invention sufficiently full, clear, and exact to enable others skilled in the art to which it appertains to make and use the same.

The object of our invention is to obviate the necessity of wetting or soaking the material or rags in the separation of animal from vegetable fibers, and to provide a practical means whereby the chemical disintegrating agent or agents employed for the destruction of the vegetable fibers can be conveniently conveyed into contact with the material to be acted upon in such manner as not to injuriously affect the animal fibers, and to so simplify the method of separation that the process can be successfully worked by the assistance of unskilled laborers.

To this end our invention consists in the employment of an inert comminuted substance into which the disintegrating agent is absorbed, to be then mingled with the material to be acted upon, and subsequently rendered active for the destruction of the vegetable fiber, as more fully hereinafter set forth; also, in the utilization of the waste product or dust composed of disintegrated vegetable fiber as a vehicle for the absorption and conveyance of the chemical agents in the process herein described.

In carrying our invention into effect in the treatment of mixed rags for the recovery of wool fiber we take of an ordinary hydrated acid of commerce (preferably hydrochloric acid or a mixture of equal parts of hydrochloric and sulphuric acids) a quantity in weight equal to about four per cent. (more or less) of the weight of rags or material to be treated. This chemical agent we mix with a suitable comminuted finely granulated or pulverized substance of an inert nature, as wood-sawdust, the dust of disintegrated vegetable fiber, or other similar material, a sufficient amount of such comminuted substance being employed to absorb the liquid acid or chemicals and form a comparatively dry mass that will not, to any practical degree, transfer its moisture by contact.

The rags or material to be treated are placed within a suitable receiver adapted to be revolved or to permit mechanical agitation of its contents. The comminuted substance containing the absorbed chemical agents is also placed in the receiver and mingled with the rags, thus distributing the chemical-charged particles throughout the mass. The receiver being then closed, or nearly closed, the contents are subjected to the action of heat, the temperature being raised to between 175° and 225° Fahrenheit, varying somewhat according to the quantity and condition of the material treated, ordinarily to about 215° Fahrenheit, and held at such temperature some twenty or thirty minutes, or as required, to render the chemical agent or agents active to effect the disintegration of the cotton or vegetable fibers, the contents of the receiver being meanwhile mechanically agitated by revolving the receiver, or by any other suitable means, to insure uniform treatment throughout the mass. After heating the moist vapors are expelled or blown off by means of a hot-air blast, substantially in the manner employed in other processes, after which the rags are ready to be removed from the receiver and the dust and disintegrated vegetable matter discharged therefrom by ordinary dusting-machines, or to receive any further operation desired.

By the use of the fine dust or other inert substance for absorbing the acid or other chemical agent and holding the same in a comparatively dry form, temporarily inactive, the disintegrating agents can be conveniently and thoroughly distributed throughout the mass of material before active chemical effect on the fiber commences, and without injurious contact of the chemicals with the wool fibers. It also permits of the rags being worked dry, and consequently expedites the treatment, while the nature of the process is such that no great degree of intelligence and skill is required for its successful working and the production of uniform results.

By using the dust or discharged vegetable matter we utilize a waste product ready at hand, and one which forms a convenient and effective vehicle for absorbing the chemical agents and distributing them as required; but we do not confine our invention solely to the use of such dust, as other comminuted substances could be employed in lieu thereof; neither do we desire to confine ourselves to the use of the particular acids specified, as other chemicals may be employed in a similar manner for separating mixed fibrous materials.

What we claim as of our invention, and desire to secure by Letters Patent, is—

1. In the art of separating mixed animal and vegetable fibers by means of chemical disintegrating agents, the process of rendering said chemical agents temporarily inactive during distribution, which consists in absorbing the chemicals with a suitable comminuted or finely-granulated substance and then distributing the same in a comparatively dry or mealy condition among the mixed fibrous material, substantially as set forth.

2. In the art of separating animal fibers from vegetable fibers, the process hereinbefore described, consisting in mixing with the material to be treated, in a comparatively dry condition, a comminuted or finely-granulated inert substance saturated or impregnated with hydrated acid or other chemical disintegrating agent, and then subjecting the mass to the action of heat, substantially as set forth.

Witness our hands this 27th day of March, A. D. 1880.

GEO. M. RICE, 2D.
    ALFRED L. RICE.

Witnesses:
 CHAS. H. BURLEIGH,
 S. R. BARTON.